No. 864,571. PATENTED AUG. 27, 1907.
T. W. SMALL.
TROLLEY HARP.
APPLICATION FILED DEC. 5, 1906.
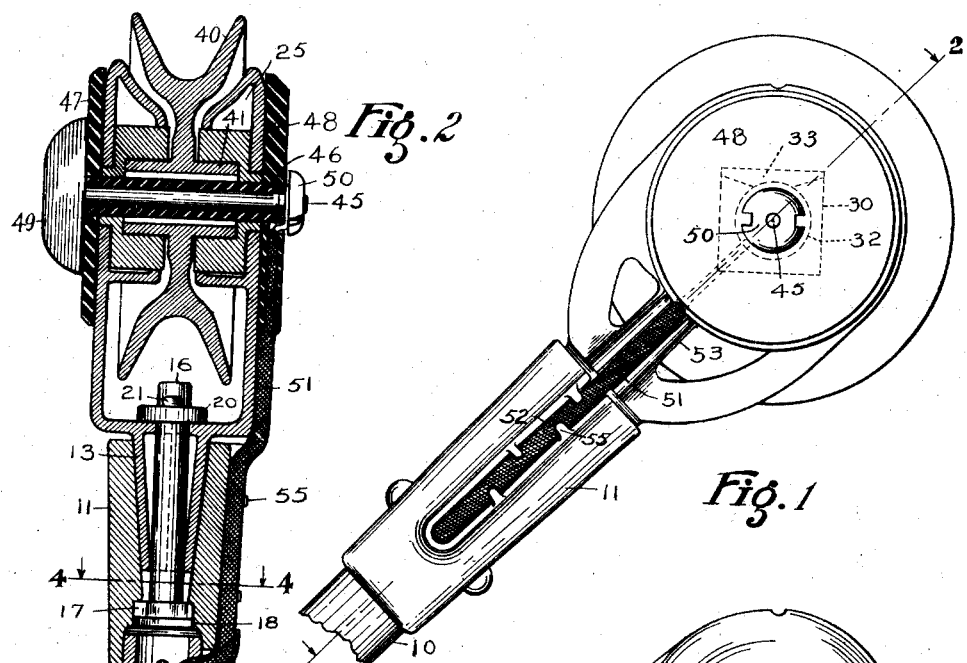
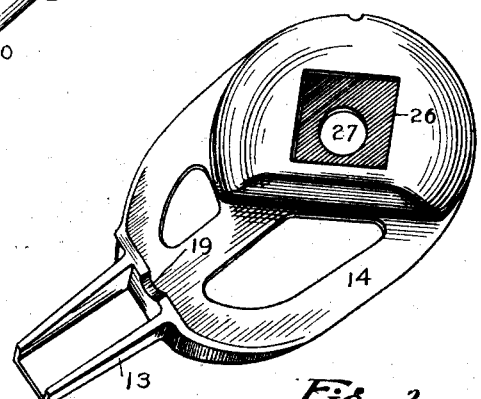
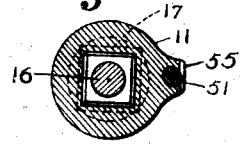
Fig. 4
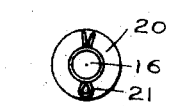
Fig. 5
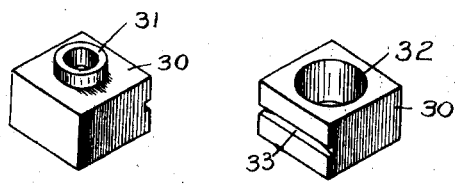
Fig. 6  Fig. 7
WITNESSES:
Brennan B. West
Nathan F. Fretter
INVENTOR,
Thomas W. Small,
BY Bates, Fouts & Hull
ATTYS.
THE NORRIS PETERS CO., WASHINGTON, D. C.

UNITED STATES PATENT OFFICE.

THOMAS W. SMALL, OF CLEVELAND, OHIO, ASSIGNOR, BY MESNE ASSIGNMENTS, TO THE ACME AUTOMATIC STREET INDICATING COMPANY, OF CLEVELAND, OHIO, A CORPORATION OF OHIO.

TROLLEY-HARP.

No. 864,571.      Specification of Letters Patent.      Patented Aug. 27, 1907.

Application filed December 5, 1906. Serial No. 346,403.

*To all whom it may concern:*

Be it known that I, THOMAS W. SMALL, a citizen of the United States, residing at Cleveland, in the county of Cuyahoga and State of Ohio, have invented a certain new and useful Improvement in Trolley-Harps, of which the following is a full, clear, and exact description, reference being had to the accompanying drawings.

The object of this invention is to provide in a very simple and efficient form, a trolley harp carrying the wheel in such manner as to insure good contact, long life and easy replacement of the parts.

Another object is to provide the harp with an additional contact device for the actuation of suitable mechanism on the car, as, for example, a street indicator.

The particular characteristics of the invention are shown in the drawings hereof, and hereinafter more fully described.

In the drawings, Figure 1 is a side elevation of the trolley harp complete. Fig. 2 is a longitudinal cross section thereof, as indicated by the line 2—2 of Fig. 1. Fig. 3 is a perspective view of one of the halves of the trolley harp. Fig. 4 is a cross section on the line 4—4 of Fig. 2. Fig. 5 is a detail illustrating the means for locking the harp halves in place. Figs. 6 and 7 are perspective views from opposite sides of the bushing in which the wheel trunnions seat.

As shown in the drawings, 10 represents the trolley pole, the upper end of which carries a socket sleeve 11. Seating in a squared bore in this socket are the extensions 13 of the harp halves or sections 14. These harp halves are held in the socket by an axial bolt 16, the square head 17 of which engages in a correspondingly shaped recess 18 in the sleeve. Above this recess the body of the sleeve provides shoulders against which such head bears. The harp extensions 13 are tapered, as shown, to snugly fit the bore of the sleeve. These two extensions abut each other, and the bolt 16 passes through an opening provided by a semi-circular recess 19 in each harp half. A washer 20 surrounds the bolt, and a cotter pin 21 passing through the bolt above the washer holds the parts in place. This makes a very simple and easily applied structure. The simple removal of the cotter pin allows the harp halves to be drawn out of the socket, and the harp taken apart.

Each harp half 14 carries an integral oil chamber 25 on its inner side. Through the inner wall of this oil chamber is a square opening 26, while through the outer wall is a circular opening 27. I provide a pair of bushings 30, which may be made of steel, each bushing having a square exterior adapted to fit in the opening 26, and a cylindrical extension 31 adapted to fit in the opening 27. The trolley wheel is designated 40. It has integral trunnions 41 which extend outwardly from opposite faces and are adapted to occupy corresponding cylindrical recesses 32 in the bushings 30. Grooves 33 or other openings in the bushings furnish communication from the oil chamber to the trunnions 41. The trunnion 41 is made hollow, and passing loosely through it, through the bushings 60 and through the harp halves, is a stationary bolt which braces the entire structure. In my construction, I use this bolt also to carry the additional contact for operating the indicating mechanism, for example. As shown in the drawings, this bolt is designated 45. It occupies a fiber sleeve 46 which extends across the harp, setting in the bores of the cylindrical extensions 31 of the bushings. This fiber sleeve projects beyond the bushings and passes into central openings in fiber disks 47 and 48 on the outer side of the harp halves. The bolt 45 is provided with an enlarged head or boss 49 which is adapted to engage a suitable member to make contact. On the other end of the bolt screws a nut 50 adapted to hold the parts in place.

51 represents a flexible conductor which extends upwardly from the interior of the trolley pole 10, out through an opening in the socket piece 11, and along a groove 52 formed in the outer side of the corresponding groove 53 formed in the outer side of the corresponding harp-section, thence passing through an opening in the disk 48 and terminating finally beneath the nut 50, which thus forms an electric contact with it. As shown, the conductor 51 occupies a tubular radial opening in the disk 48, though if desired, this might be a groove. Suitable lugs 55 are provided on the sleeve 11 adjacent to the groove 52 and are adapted to be bent over onto the conductor 51 to hold it in place.

It will be seen that my wheel is simple in construction, easily put together and taken apart, and that the wearing surfaces are provided in such form that they will last a long time and may be easily renewed. The extra contact I provide does not interfere in any manner with the ordinary operation of the trolley. It may coöperate with any suitable contact carried adjacent to the trolley wire, as for example, a series of spring plates at right angles to the path of movement with their free edges adapted to be engaged by the boss, as shown in my application 346,402, filed contemporaneously herewith.

Having thus described my invention, I claim:

1. In a trolley harp, the combination of harp sections with downward extensions, a socket which said extensions are adapted to occupy, a bolt lying between such extensions in the socket and having a head bearing against the underside of a shoulder provided by the socket, and means on said bolt near its upper end for holding the harp sections in the socket.

2. In a trolley harp, the combination of a pair of harp sides, each having a chamber on its inner face, a non-circular opening through the wall of such chamber, an opening through the outer wall of the harp side, non-circular bushings occupying the chambers and engaging the non-circular openings in the inner walls and abutting the inner face of the outer walls and having extensions occupying the openings in the outer walls, and a trolley wheel having trunnions bearing in recesses in said bushings.

3. In a trolley harp, the combination with the harp sides each having a chamber on its inner face, with a non-circular opening through the inner wall of such chamber and an opening through outer wall of the harp side, of non-circular bushings occupying the chambers and engaging the non-circular openings in the inner walls and having tubular extensions occupying the openings in the outer walls, and an insulating sleeve extending from one harp side to the other and occupying such tubular extensions, an axial rod occupying such sleeve, and a trolley wheel having trunnions bearing in recesses in said bushings.

4. The combination of a separable trolley harp, a wheel carried thereby, of a contact boss insulatingly carried by the harp and an axial bolt which is insulated from the harp and connected at one end to said boss and serves to brace the harp sections.

5. In a trolley harp, in combination, harp sides, a trolley wheel having trunnions mounted in said sides, an axial opening through said wheel, a bolt passing through said opening, a contact member on said bolt, said contact member and bolt being insulated from the wheel and harp, and a conductor in electrical connection with said contact member.

6. The combination with a trolley wheel and its supporting harp, of insulating plates on the outer sides of the harp, an insulating sleeve extending through the harp, a bolt occupying said sleeve, a contact head on one end of the bolt, and clamping means on the other end of the bolt.

7. The combination of a pair of harp halves presenting inwardly facing recesses, a trolley wheel having outwardly extending trunnions mounted in said recesses, an insulating sleeve extending through said wheel and out of engagement therewith, a bolt extending through said sleeve, a contact member at one end of the bolt, and an electric conductor in electrical connection with said member.

8. The combination of a trolley wheel and the harp which carries it, of an insulating sleeve axial of said wheel, a bolt occupying said sleeve, a head on one end of the bolt, a clamping nut on the other end of the bolt, insulating plates between said head and harp and between said nut and harp.

9. The combination of a socket, a pair of harp sections setting therein, a trolley wheel carried by said sections, an additional contact carried by the harp, and a conductor in electrical connection with said contact, there being a groove on the outer side of said socket which said conductor occupies.

10. The combination of a socket, a pair of harp halves seating therein, a trolley wheel carried by said halves, a bolt extending through the wheel and clamping the halves together, a contact head carried by said bolt, a conductor in electric connection with said head, there being a groove on the outer side of the corresponding harp half which said conductor occupies.

11. The combination of a harp having inwardly facing recesses, a wheel having outwardly extending trunnions journaled in said recesses, an axial opening through said wheel, an insulating sleeve extending across the harp through said opening, a bolt occupying said sleeve, a contact head on one end of the bolt, a nut screwing onto the other end of the bolt, and an electric conductor clamped by said nut.

12. The combination of a pair of harp halves having inwardly facing recesses which are non-circular, bushings having non-circular exteriors occupying said recesses, a trolley wheel journaled in said bushings, an insulating sleeve extending across the wheel and engaging said bushings, a bolt occupying said sleeve, a contact head on one end of the bolt, and means for securing the other end of the bolt.

13. The combination of a pair of harp sections having chambers whose inner walls have angular openings, there being co-axial openings through the outer walls, bushings having angular exteriors occupying said openings in the inner walls and having tubular extensions occupying said openings of the outer walls, a trolley wheel journaled in said bushings, an insulating sleeve extending across the wheel and occupying said tubular extensions of the bushings, a bolt occupying said sleeve, a contact head on one end of the bolt, and means for securing the other end of the bolt.

In testimony whereof, I hereunto affix my signature in the presence of two witnesses.

THOMAS W. SMALL.

Witnesses:
ALBERT H. BATES,
G. A. MYERS.